: US005978607A

United States Patent [19]
Teremy et al.

[11] Patent Number: 5,978,607
[45] Date of Patent: Nov. 2, 1999

[54] CAMERA WITH SCANNED DISPLAY IN VIEWFINDER

[75] Inventors: Paul Teremy, Rochester, N.Y.; Arnold W. Lungershausen, Austin, Tex.

[73] Assignee: Eastman Kodak Company, Rochester, N.Y.

[21] Appl. No.: 08/905,986

[22] Filed: Aug. 5, 1997

[51] Int. Cl.[6] .................................................. G03B 17/18
[52] U.S. Cl. .......................................... 396/288; 396/373
[58] Field of Search ..................................... 396/288, 373

[56] References Cited

U.S. PATENT DOCUMENTS

| | | |
|---|---|---|
| 3,633,988 | 1/1972 | Farrar . |
| 3,680,945 | 8/1972 | Sheridon . |
| 4,165,930 | 8/1979 | Matsumoto et al. . |
| 4,255,032 | 3/1981 | Matsumoto et al. . |
| 4,265,522 | 5/1981 | Matsumoto et al. . |
| 4,294,529 | 10/1981 | Sato et al. . |
| 4,374,612 | 2/1983 | Matsumura et al. . |
| 4,576,458 | 3/1986 | Cho et al. . |
| 4,902,082 | 2/1990 | Okabayashi eta l. . |
| 5,053,803 | 10/1991 | Suda et al. ............................. 396/288 |
| 5,475,512 | 12/1995 | Nakazawa et al. . |

OTHER PUBLICATIONS

Randall K. Bartman, Paul K. C. Wang, Linda M. Miller, Thomas W. Kenny, William J. Kaiser, Fred Y. Hadaegh and Michael L. Agronin of Caltech; Micromachined, Electrostatically Deformable Relfectors, Bea–control reflectors could be integratedwith electronic control circuits. NASA'S Jet Propulsion Laboratory, Pasadena, California; Oct. 1995, pp. 10, 11a & 12a.

*Primary Examiner*—Russell Adams
*Attorney, Agent, or Firm*—Charles E. Snee, III

[57] ABSTRACT

A photographic, digital or video camera (10) includes a housing (12); optionally at least one sensor (18, 20, 25, 30, 36, 39, 40, 50) supported by the housing for detecting a condition of the camera or of a scene to be captured by the camera, or both, and for producing a signal; a viewfinder (38) supported by the housing, the viewfinder including a holographic element 64, 90); a source (68) of light having a wavelength of a color to be displayed in the viewfinder; a collimator (70) for receiving a beam from the source and producing an output beam; an optical system (72–80) to horizontally and vertically raster scan the output beam across the holographic element; and a controller (44) for operating the optical system and modulating the output beam in response to the signal, thereby to cause scanned images to be produced by interaction between the output beam and the holographic element, the scanned images displaying information related to use of the camera.

49 Claims, 3 Drawing Sheets

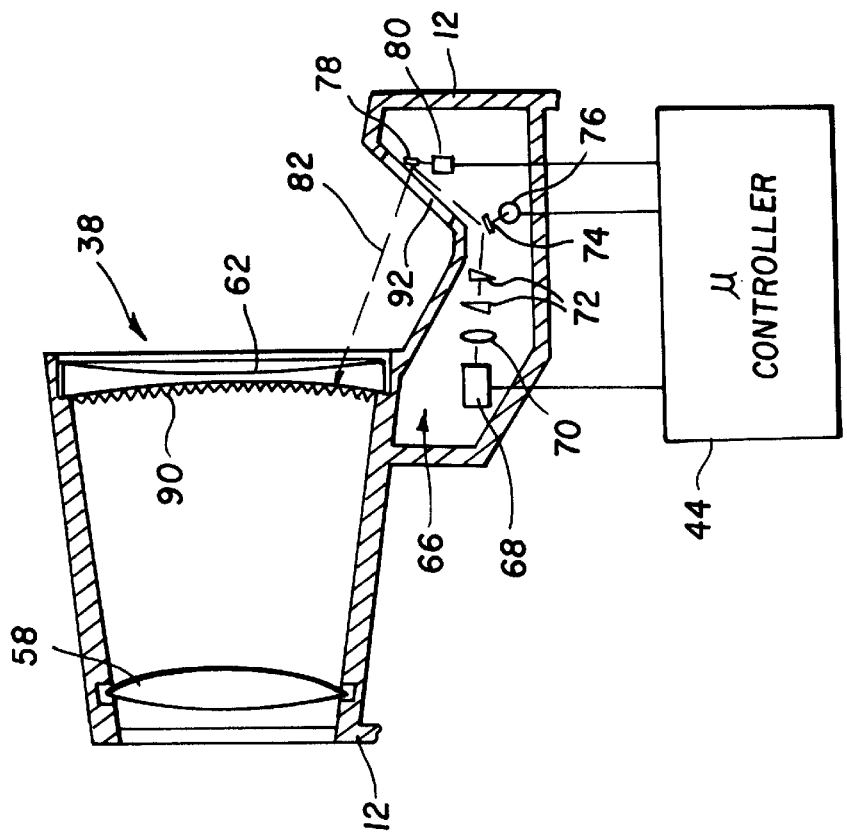
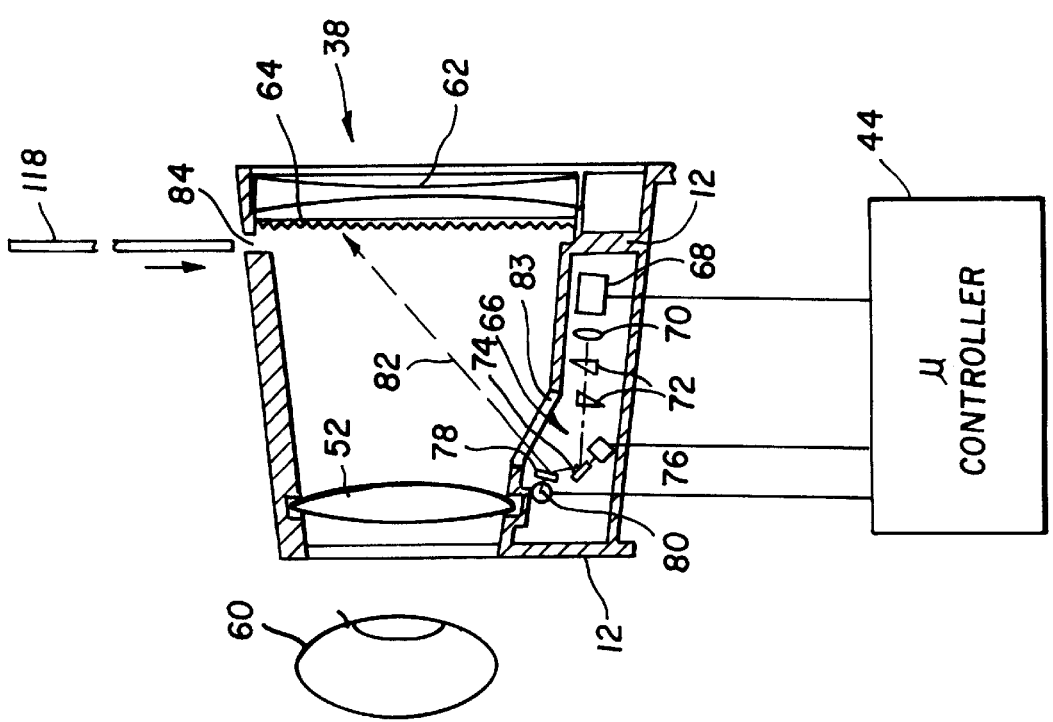

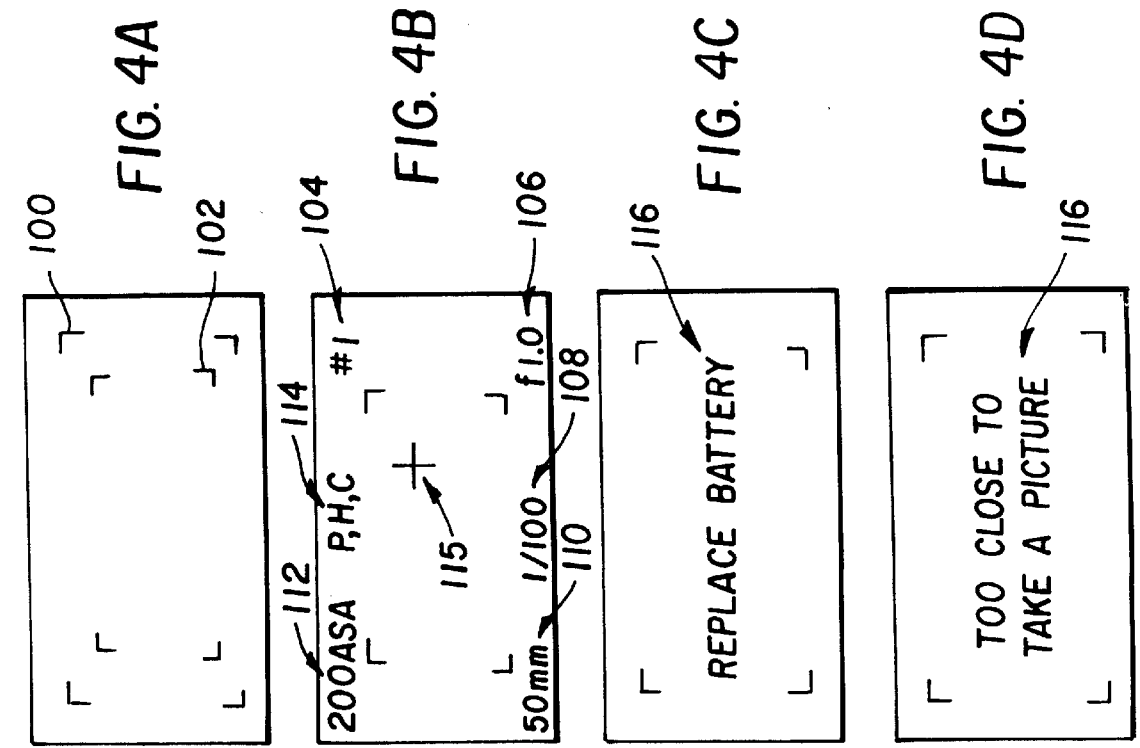

5,978,607

CAMERA WITH SCANNED DISPLAY IN VIEWFINDER

FIELD OF THE INVENTION

The invention concerns photographic, digital or video cameras. More particularly, the invention relates to viewfinders for such cameras, the viewfinders having features for displaying in real time various conditions of the camera or of a scene to be photographed or for displaying other information related to use of the camera.

BACKGROUND OF THE INVENTION

Viewfinders of varying degrees of sophistication have been used on cameras for many years. The simplest varieties usually provide some sort of frame or reticle which aids the user of the camera during composition of a scene prior to capture of an image. More complex cameras may include mechanical or electronic masking arrangements for changing the field of view to show different aspect ratios to be used for images captured. Electrically actuated analog and digital displays have been provided at edges of the field of view to indicate conditions such as light level, flash readiness, lens setting and the like.

Holographic viewfinder displays have been used in which a holographic element is illuminated in selected areas to produce fixed images. For example, separate fixed images might indicate messages such as film speed or "low light" or "flash needed." Or, separate fixed images might be provided to be illuminated as each frame is exposed. A difficulty with known holographic viewfinder displays is that the images which can be displayed are fixed in time, which severely limits the size, number and/or brightness of images which can be provided in the small field of view of a typical viewfinder. Thus, a desirable improvement would be a viewfinder with a holographic display which can be readily modified to suit the user's desires or updated to reflect changes in photographic conditions.

SUMMARY OF THE INVENTION

A camera in accordance with one embodiment of the invention would include a viewfinder which would include a holographic element which is scanned to produce images of information related to use of the camera. As such, the camera would include a housing and a viewfinder supported by the housing. The viewfinder would include a holographic element. A source of light would be included which would have a wavelength of a color to be displayed in the viewfinder. A collimator would receive a beam from the source and produce an output beam. An optical system would be included to horizontally and vertically raster scan the output beam across the holographic element. A controller would operate the optical system and modulate the output beam. Scanned images thus would be produced by interaction between the output beam and the holographic element. The scanned images would be related to use of the camera.

The camera could include a sensor for ambient light which would produce a signal to the controller and the controller would adjust power of the source of light in response to the signal as a function of ambient light level. A single output beam could be scanned across the holographic element to produce monochrome images. Alternatively, a plurality of complementary beams could be used to produce polychrome images. The source of light could be a laser or a narrow band width light emitting diode. For a viewfinder including a front lens and a rear lens, the holographic element could be a plate between the front and rear lenses or a layer on the front lens.

The camera could include a sensor for determining range to an object to be photographed and for producing a signal to the controller for focusing the camera; and the controller could operate the optical system in response to the signal and modulate the output beam to display depth of field in the viewfinder or to correct for parallax. The camera could include a sensor for determining the direction of gaze of a user's eye and for producing a signal to the controller; and the controller could operate the optical system in response to the signal and modulate the output beam to display the direction of gaze in the viewfinder.

The viewfinder could include a front lens and a rear lens; and the holographic element could be located in the viewfinder such that the scanned images and an image of an object to be photographed can be viewed in focus through the rear lens. The holographic element could be located behind the front lens and the output beam could pass through a space between the front and rear lenses to reach the holographic element. Alternatively, the output beam could pass through the front lens to reach the holographic element. The camera could include a chamber external of the viewfinder with the source of light, collimator and optical system being located in the chamber; and further could include an opening for the output beam to pass from the chamber into the viewfinder. The optical system could include a first mirror for horizontally deflecting the output beam; a second mirror for vertically deflecting the output beam; a first actuator for tilting the first mirror; and a second actuator for tilting the second mirror. The output beam could go first to the first mirror and second to the second mirror, or vice versa.

The camera could be a film camera, a digital camera or a video camera A film camera could further include an area array sensor for capturing an electronic image of a scene; and the holographic element then could display the electronic image to enable the user to verify the content of an image exposed onto film. The scanned image could include framing reticles or annotations to appear with prints made from images captured by the camera. The viewfinder could include a holder for a light sensitive member to be selectively exposed by the output beam.

A camera in accordance with another embodiment of the invention could include at least one sensor supported by the housing for detecting a condition of the camera or of a scene to be captured by the camera, or both, and for producing a signal to which the controller would respond to modulate the output beam. The sensor could detect and the scanned image could display conditions including frame number, aperture setting, shutter speed, focal length, film speed, print aspect ratios and photographic conditions such as ambient light and distance to an object to be photographed.

A camera having a viewfinder in accordance with the invention would provide various advantages. Because the holographic element would be scanned to produce scanned images, the images could be updated in real time to reflect changes in conditions of the camera or its environment. The controller of the camera could be programmed to provide a very large variety of scanned images, depending on the user's desires, the intended use of the camera, and similar factors. The scanned images could be of any desired size and brightness and could be located at any desired location in the field of view. Text for the scanned images could be programmed for practically any desired language. The user would be able to operate the camera more quickly and easily for successive exposures due to the ready availability of the information presented in the viewfinder. The user would be able at a glance to check the photographic conditions of interest, since the scanned images would be presented at an image plane in the mid-range of the viewfinder's optics where the images would be easily read. The user would be able to read the scanned images without removing his or her eye from the viewfinder, which would be more convenient than currently known displays outside the viewfinder. The conditions to be displayed could be selected by the user using a keypad and display located on an exterior surface of the camera. Since available components for the scanning system and the holographic element are quite small, the features of the invention could be provided without significantly increasing the overall size of the camera.

BRIEF DESCRIPTION OF THE DRAWINGS

FIG. 2 shows a view taken along line 2,3-2,3 of FIG. 1, indicating details of a first embodiment of the viewfinder.

FIG. 3 shows a view taken along line 2,3-2,3 of FIG. 1, indicating details of a second embodiment of the viewfinder.

FIGS. 4A to 4H show various types of scanned images which can be produced by a viewfinder in accordance with the invention.

DETAILED DESCRIPTION OF THE INVENTION

Figure 1:
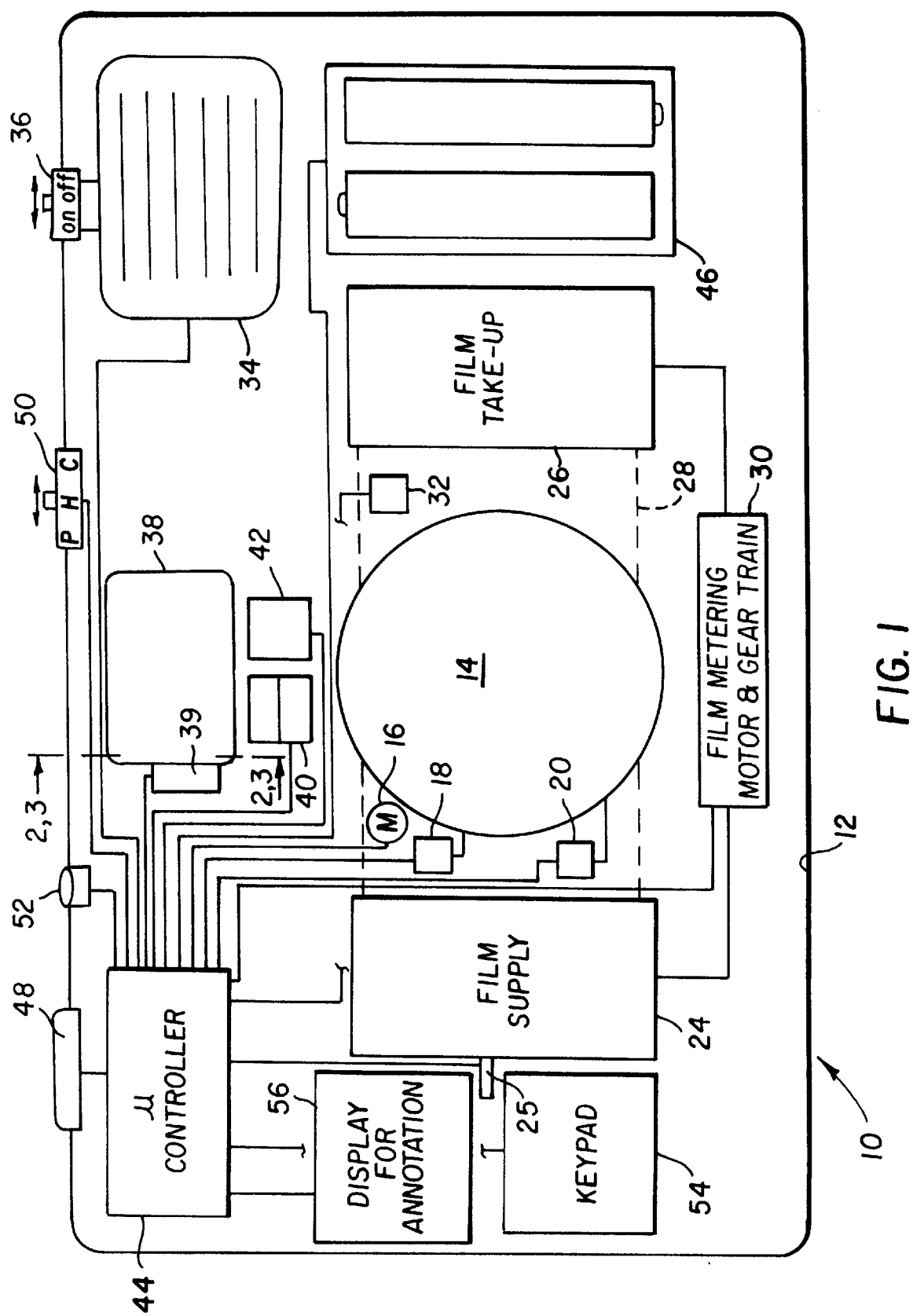
FIG. 1 shows a schematic view of a camera embodying a viewfinder in accordance with the invention.

FIG. 1 shows a schematic view of a camera 10 according to the invention. Although this specification presents details of a type of photographic film camera, those skilled in the art will appreciate that the viewfinder to be described later could be used equally well in a digital camera or a video camera A camera body or housing 12 is shown only in outline but could be completely conventional, as will be understood by those skilled in the camera arts. A conventional zoom lens 14 would be connected to a zoom motor 16. A separate motor, not shown, may be included in zoom lens 14, to adjust focus in the familiar manner. Settings of an aperture, not shown, could be determined by a controller of the camera and controlled by a conventional driver 18, which could have an aperture sensor, not shown. Speed settings of a shutter, not shown, could be determined by the controller and controlled by a conventional driver 20, which could have a shutter speed sensor, not shown. Within housing 12 on either side of zoom lens 14 would be a film supply chamber 24 associated with a sensor 25 for detecting film speed codes on a film cartridge installed in chamber 24, and a film take-up chamber 26 associated with a spool, not shown, for winding a filmstrip 28 advanced from a cartridge in chamber 24. A conventional film metering motor and gear train system 30, or conventional manual metering mechanism, not shown, would be provided for moving filmstrip 28 between chambers 24, 26 in the familiar manner. System 30 could include a sensor, not separately shown, for signaling a controller each time a fresh frame of film is transported into position for exposure, thus enabling the camera to monitor number of exposures or frame numbers in a conventional manner. A conventional magnetic read/write head 32 could be provided for reading magnetic information on or writing magnetic information onto filmstrip 28, in the manner known for currently available Advanced Photographic System cameras.

A conventional flash unit 34 and flash on/off switch 36 could be provided. Preferably centrally of housing 12 would be located a viewfinder 38 in accordance with the invention. To minimize horizontal parallax effects, viewfinder 38 could be located directly above zoom lens 14, as will be understood by those skilled in the art. A conventional sensor 39 could be provided in viewfinder 38 for determining a direction of gaze of a user's eye during use of the viewfinder, to enable the camera to determine where in a scene is a subject of particular interest to the user. A conventional auto-focus emitter/receiver 40 could be included for optically sensing distance to a subject in a scene and providing a signal to a controller for operation of lens 14 to provide proper focus. An electronic scene sensor 42, such as a conventional photo-sensor or an area array of charge-coupled devices or the like, could be provided for measuring reflected light from the scene to aid in setting aperture and shutter speed in the familiar manner. Sensor 42 also could be used for electronically capturing a scene essentially simultaneously with an exposure onto filmstrip 28, to permit verification of an image captured on film.

A conventional micro-controller 44 would be provided for receiving input signals from the aperture and shutter drive systems and from sensors 25, 30, 32, 36, 39, 40, and 42 and for providing control output signals to components such as zoom motor 16, aperture driver 18, shutter driver 20, system 30, read/write head 32, flash unit 34 and, as will be discussed shortly in this specification, to viewfinder 38. The various sensors detect conditions of the camera or of a scene to be captured by the camera. A power source 46, such as a plurality of batteries, would be connected to controller 44 to provide electrical power to the various sensors, drivers and components of the camera. A conventional electro-mechanical trigger button 48 would extend from a convenient surface of housing 12 to enable user to make an exposure onto filmstrip 28. An aspect ratio selector switch or sensor 50 could be included in cameras which use Advanced Photographic System films, to provide a signal to controller 44 of the aspect ratio selected by a user for a print later to be made from a captured image. A conventional flash-ready light 52 could be provided to enable controller 44 to signal a user that flash unit 34 is ready for use. A conventional alpha-numeric key pad 54 could be provided on an exterior surface of housing 12 to enable a user of the camera to enter commands to controller 44. A conventional liquid crystal display 56 could be included to display commands entered by the user or to display other information about the camera, as will be familiar to those skilled in the art. Using the signal from emitter/receiver 40, plus the setting of the aperture and focal length of the lens, controller 44 can cause a range of distances, not shown, to be displayed to indicate the depth of field, or reticles to be displayed to correct for parallax.

As shown in FIG. 2, viewfinder 38 could include a conventional rear, positive eye lens 58 for close viewing by an eye 60 of a user of the camera; and a conventional front, negative objective lens 62 for capturing light reflected from scene to be photographed and transmitting an image to rear lens 58. The invention could also be applied to viewfinders having only one lens or no lenses. In accordance with the invention, a holographic element or plate 64 would be positioned between lenses 58, 62 to display scanned images to the user. When no scanned images are to be displayed, element 64 would be transparent. In the embodiment of FIG. 2, element 64 would be made so that it would act as a beam splitter to allow ordinary viewing as in a conventional viewfinder, but also would allow light from a narrow bandwidth source to be scanned across the element and diverged toward the viewer's eye as though the scanned light were coming from an object in a scene to be photographed. The source could have a band width of about 25 nanometers around the central wavelength of the color to be displayed, for example. Element 64 could be made from a known volume type holographic material, such as a layer of dichromated gelatin or conventional photopolymer on a transparent substrate. To form a reflection type holographic element 64, an object laser beam and a reference laser beam would be caused to interfere at the layer of holographic material, with the reference beam coming from the eye side of the element and the object beam coming from the other side. The interfering beams would cause changes in the layer of holographic material. Those skilled in the holographic arts will appreciate that, when the completed holographic element is illuminated at an appropriate angle with light of the color to be displayed, a scanned image of the object will appear in that color. Processes for making holographic elements are well known, such as those disclosed in U.S. Pat. No. 3,680,945, which is incorporated by reference into this specification. Those skilled in the art will appreciate that holographic elements of various types could be used in accordance with the present invention, such as volume elements as disclosed in U.S. Pat. No. 4,165,930; and Fresnel and rainbow elements as disclosed in U.S. Pat. No. 4,576,458. The contents of these latter U.S. patents also are incorporated by reference into this specification.

A chamber 66 would be provided external to viewfinder 38 to enclose an optical system for illuminating holographic element 64. A conventional diode laser or light-emitting diode source 68, having a wavelength for the color to be displayed, would be located in chamber 66. Source 68 would be connected to controller 44 which would control modulation of an output beam from the source. A single light source could be used to provide a monochrome display of scanned images; however, a viewfinder in accordance with the invention also could include a plurality of light sources, only one being illustrated, to provide a polychrome display.

An output beam emitted from source 68 would pass through a conventional collimating lens 70 to provide a collimated beam. If a laser diode is used, a pair of conventional correction prisms 72 may be desirable to provide a beam of more circular cross-section. The collimated and circularized beam then would enter a beam-steering optical system including a vertical scanning mirror 74 connected to a tilting actuator or motor 76 controlled by controller 44, followed by a horizontal scanning mirror 78 connected to a tilting actuator or motor 80, also controlled by controller 44. Alternatively, the beam could first encounter mirror 78 and second encounter mirror 74. Small mirrors and actuators are known which would be suitable for use in the invention, such as those described in "Micromachined, Electrostatically Deformable Reflectors", *NASA Technical Briefs,* pages 10a to 12a, October 1995, which is incorporated by reference into this specification.

Controller 44 would operate to selectively deflect the beam horizontally and vertically, to produce a raster scanning beam 82 which would pass through an opening 83 from chamber 66 to rapidly scan horizontally and vertically across holographic element 64. Controller 44 at the same time would modulate beam 82 to produce a desired scanned image. In response to the level of ambient light sensed by sensor 42, controller 44 also could adjust the power level of beam 82. The scanned image would appear in focus to a user looking through rear lens 58 to view an object in a scene to be photographed. Since the scanned image would be virtual, it would appear to come from the same distance as the scene to be photographed. A slot 84 could be provided behind holographic element 64 to enable a user to insert a slide or sticker to be scanned by beam 82, as will be discussed with regard to FIG. 4F.

FIG. 3 shows a second embodiment of viewfinder 38 in which light source 68, collimating lens 70, prisms 72 and the beam-steering optical system are supported within housing 12 so that raster beam 82 must pass through front lens 62 to reach the holographic element. In this instance, rather than a separate holographic element 64, a transmissive holographic element or layer 90 is coated onto a rear surface of front lens 62. A reflective holographic element also could be coated onto a rear surface of lens 62 in the embodiment of FIG. 2. Otherwise, element 90 is prepared and used just like element 64. The layer of holographic material coated onto lens 62 also could be used to correct for aberration of the scanned image. As indicated in FIG. 3, beam 82 passes through a window 92 from chamber 66 and passes through front lens 62.

Because raster beam 82 would be modulated by controller 44, a wide variety of scanned images could be produced. As shown in FIG. 4A, framing reticles 100, 102 could be permanently provided on holographic element 64, 90 by known etching or painting techniques, or the like. Or the images of such reticles could be provided by scanning and modulating beam 82. As shown in FIG. 4B, system 30 could produce a signal corresponding to frame number and controller 44 could modulate beam 82 to cause a scanned image of a frame number 104 to appear in the user's field of view. Similarly, the aperture drive system could produce a signal corresponding to aperture setting and controller 44 could cause a scanned image of an aperture setting 106 to appear. The shutter drive system could produce a signal corresponding to a selected shutter speed and controller 44 could cause a scanned image of a shutter speed 108 to appear. Similarly, in response to signals from emitter/receiver 40, controller 44 could cause a scanned image of a zoom lens focal length 110 to appear. A range of distances, not shown, could be caused to appear to indicate the depth of field determined by controller 44. Sensor 25 could signal the controller of the film speed and controller 44 could cause a scanned image of film speed 112 to appear. The user's setting of switch or sensor 50 would signal controller 44 which could cause a scanned image of aspect ratio 114 to appear. For example, one of the letters P, H, or C could appear to indicate panoramic, high-definition television or conventional aspect ratios. Or scanned images of reticles or lines indicating selected aspect ratio, not shown, could be caused to appear. Sensor 39 could signal controller 44 of the direction of gaze of the user and corresponding images of a cross mark 115 or reticles, not shown, could be caused to appear. As shown in FIGS. 4C to 4E, various warning statements 116 could be caused to appear to alert the user, for example, that the batteries require replacement, that the subject is too close, or that fill flash should be used.

In accordance with another feature of the invention shown in FIG. 4F, a light sensitive member such as a slide or sticker 118 could be provided with a coating of a conventional material which can be marked or ablated by raster beam 82. Sticker 118 could be dropped through slot 84, as shown in FIG. 1, so that the sticker would intercept beam 82. The user would have used key pad 54 to enter an annotation 120 to be recorded onto the sticker and controller 44 could prompt the user at display 56 or at holographic element 64, for example, to insert a sticker for scanning. After scanning, the sticker could then be removed and later applied to a print for the corresponding image. Alternatively, as shown in FIG. 4G, the user could use key pad 54 to enter an annotation 122 to be recorded onto filmstrip 28 by read/write head 32, to enable a photofinisher to read the annotation from the filmstrip and record it onto a print made from a captured image.

FIG. 4H shows how holographic element 64,90 could be used to provide a verification display 124 of a still image last captured on film, in a film camera, or electronically, in a digital or video camera. Sensor 42 would capture an electronic image of a scene and controller 44 would cause beam 82 to scan element 64, 90 to produce a corresponding scanned image which would enable a user to verify that the desired image was captured on film.

The invention has been described in detail with particular reference to certain preferred embodiments thereof, but it will be understood that variations and modifications can be effected within the spirit and scope of the invention.

PARTS LIST

| | | | |
|---|---|---|---|
| 10 | camera | 64 | holographic plate or element |
| 12 | camera body or housing | 66 | chamber external of 38 |
| 14 | zoom lens | 68 | light source |
| 16 | zoom motor | 70 | collimator lens |
| 18 | aperture driver | 72 | correction prisms |
| 20 | shutter speed driver | 74 | vertical scan mirror |
| 24 | film supply chamber | 76 | actuator for 74 |
| 25 | film speed sensor | 78 | horizontal scan mirror |
| 26 | film take-up chamber | 80 | actuator for 78 |
| 28 | film strip | 82 | scanning beam |
| 30 | film metering motor and gear train system | 83 | opening from 66 into 38 |
| | | 84 | slot for slides or stickers |
| 32 | magnetic read/write head | 90 | holographic layer or element |
| 34 | flash unit | 92 | window from 66 toward 38 |
| 36 | flash on/off switch | 100, 102 | optional framing reticles |
| 38 | viewfinder | 104 | scanned image of frame number |
| 39 | eye gaze sensor | | |
| 40 | autofocus emitter/receiver | 106 | scanned image of aperture setting |
| 42 | electronic scene sensor | | |
| 44 | microcontroller | 108 | scanned image of shutter speed |
| 46 | power source | 110 | scanned image of zoom lens focal length |
| 48 | trigger button | | |
| 50 | aspect ratio selector switch/sensor | 112 | scanned image of film speed |
| | | 114 | scanned image of aspect ratio |
| 52 | flash ready light | 115 | scanned image of mark for direction of gaze |
| 54 | keypad | | |
| 56 | display for annotations | 116 | scanned image of warning statement |
| 58 | positive eye lens | | |
| 60 | eye of user of camera | 118 | slide or sticker |
| 62 | negative objective lens | 120 | scanned image of text for 118 |
| | | 122 | scanned image of annotation to appear on print |
| | | 124 | scanned verification display of of last image |

What is claimed is:

1. A camera, comprising:

a housing;

at least one sensor supported by said housing for detecting a condition of said camera or of a scene to be captured by said camera, or both, and for producing a signal;

a viewfinder supported by said housing, said viewfinder including a holographic element;

a source of light having a wavelength of a color to be displayed in said viewfinder;

a collimator for receiving a beam from said source and producing an output beam;

an optical system to horizontally and vertically raster scan said output beam across said holographic element; and a controller for operating said optical system and modulating said output beam in response to said signal, thereby to cause scanned images to be produced by interaction between said output beam and said holographic element, said scanned images displaying information related to said condition of said camera or scene to be photographed, or both.

2. A camera according to claim 1, further comprising a sensor for ambient light which produces a further signal to said controller; wherein said controller adjusts power of said source of light in response to said further signal as a function of ambient light level.

3. A camera according to claim 1, wherein a single output beam is scanned across said holographic element.

4. A camera according to claim 1, wherein said viewfinder includes a front lens and a rear lens and said holographic element is a plate between said front and rear lenses.

5. A camera according to claim 1, wherein said viewfinder includes a front lens and said holographic element is a layer on said front lens.

6. A camera according to claim 1, wherein said source of light comprises a laser.

7. A camera according to claim 1, wherein said source of light comprises a light-emitting diode.

8. A camera according to claim 1, further comprising a sensor for determining range to an object to be photographed and for producing a further signal to said controller for focusing said camera; wherein said controller operates said optical system in response to said further signal and modulates said output beam to display a scanned image of depth of field in said viewfinder.

9. A camera according to claim 1, wherein said viewfinder has a front lens and said output beam passes through said front lens to reach said holographic element.

10. A camera according to claim 1, wherein said camera comprises a chamber external of said viewfinder, said source of light, collimator and optical system being located in said chamber; further comprising an opening for said output beam to pass from said chamber into said viewfinder.

11. A camera according to claim 1, wherein said optical system comprises a first mirror for horizontally deflecting said output beam; a second mirror for vertically deflecting said output beam; a first actuator for tilting said first mirror; and a second actuator for tilting said second mirror.

12. A camera according to claim 11, wherein said first mirror receives said output beam before said second mirror.

13. A camera according to claim 11, wherein said second mirror receives said output beam before said first mirror.

14. A camera according to claim 1, wherein said viewfinder has a front lens and a rear lens; and said holographic element is located in said viewfinder such that said scanned images and an image of an object to be photographed can be viewed simultaneously in focus through said rear lens.

15. A camera according to claim 1, wherein said camera is a film camera.

16. A camera according to claim 1, wherein said camera is a digital camera.

17. A camera according to claim 1, wherein said camera is a video camera.

18. A camera according to claim 1, wherein said sensor detects and said scanned image displays frame number.

19. A camera according to claim 1, wherein said sensor detects, and said scanned image displays, an aperture setting of said camera.

20. A camera according to claim 1, wherein said sensor detects, and said scanned image displays, a shutter speed of said camera.

21. A camera according to claim 1, further comprising a sensor for determining range to an object to be photographed and for producing a further signal to said controller for focusing said camera; wherein said controller operates said optical system in response to said further signal and modulates said output beam to display a scanned image of reticles for parallax correction in said viewfinder.

22. A camera according to claim 1, wherein said sensor detects and said scanned image displays focal length of a lens of said camera.

23. A camera according to claim 1, wherein said sensor detects and said scanned image displays film speed.

24. A camera according to claim 1, wherein said sensor detects and said scanned image displays selected aspect ratio for a print to be made from a captured image.

25. A camera according to claim 1, wherein said sensor detects and said scanned image displays warnings about photographic conditions.

26. A camera according to claim 1, wherein said sensor is an area array sensor for capturing an electronic image of a scene; and said scanned image displays said electronic image.

27. A camera, comprising:
 a housing;
 a viewfinder supported by said housing, said viewfinder including a holographic element;
 a source of light having a wavelength of a color to be displayed in said viewfinder;
 a collimator for receiving a beam from said source and producing an output beam;
 an optical system to horizontally and vertically raster scan said output beam across said holographic element; and
 a controller for operating said optical system and modulating said output beam, thereby to cause scanned images to be produced by interaction between said output beam and said holographic element, said scanned images being related to use of the camera.

28. A camera according to claim 27, further comprising a sensor for determining range to an object to be photographed and for producing a further signal to said controller for focusing said camera; wherein said controller operates said optical system in response to said further signal and modulates said output beam to display a scanned image of reticles for parallax correction in said viewfinder.

29. A camera according to claim 27, further comprising a sensor for ambient light which produces a signal to said controller; wherein said controller adjusts power of said source of light in response to said signal as a function of ambient light level.

30. A camera according to claim 27, wherein a single output beam is scanned across said holographic element.

31. A camera according to claim 27, wherein said viewfinder includes a front lens and a rear lens and said holographic element is a plate between said front and rear lenses.

32. A camera according to claim 27, wherein said viewfinder includes a front lens and said holographic element is a layer on said front lens.

33. A camera according to claim 27, wherein said source of light comprises a laser.

34. A camera according to claim 27, wherein said source of light comprises a light-emitting diode.

35. A camera according to claim 27, further comprising a sensor for determining range to an object to be photographed and for producing a signal to said controller for focusing said camera; wherein said controller operates said optical system in response to said signal and modulates said output beam to display a scanned image of depth of field in said viewfinder.

36. A camera according to claim 27, wherein said viewfinder has a front lens and said output beam passes through said front lens to reach said holographic element.

37. A camera according to claim 27, wherein said camera comprises a chamber external of said viewfinder, said source of light, collimator and optical system being located in said chamber; further comprising an opening for said output beam to pass from said chamber into said viewfinder.

38. A camera according to claim 27, wherein said optical system comprises a first mirror for horizontally deflecting said output beam; a second mirror for vertically deflecting said output beam; a first actuator for tilting said first mirror; and a second actuator for tilting said second mirror.

39. A camera according to claim 38, wherein said first mirror receives said output beam before said second mirror.

40. A camera according to claim 38, wherein said second mirror receives said output beam before said first mirror.

41. A camera according to claim 27, wherein said viewfinder has a front lens and a rear lens; and said holographic element is located in said viewfinder such that said scanned images and an image of an object to be photographed can be viewed simultaneously in focus through said rear lens.

42. A camera according to claim 27, wherein said camera is a film camera.

43. A camera according to claim 27, wherein said camera is a digital camera.

44. A camera according to claim 27, wherein said camera is a video camera.

45. A camera according to claim 27, further comprising an area array sensor for capturing an electronic image of a scene; wherein said scanned image displays a representation of said electronic image.

46. A camera according to claim 27, wherein said scanned image comprises framing reticles.

47. A camera according to claim 27, wherein said scanned image comprises annotations to appear with prints made from images captured by said camera.

48. A camera according to claim 27, wherein said viewfinder comprises a front lens and, behind said front lens, a holder for a light sensitive member to be selectively exposed by said output beam.

49. A camera according to claim 27, further comprising a sensor for determining a direction of gaze of a user's eye and for producing a signal to said controller; wherein said controller operates said optical system in response to said signal and modulates said output beam to display said direction of gaze in said viewfinder.

\* \* \* \* \*